(12) United States Patent
Taniguchi et al.

(10) Patent No.: US 7,934,934 B2
(45) Date of Patent: May 3, 2011

(54) ELECTRIC JUNCTION BOX FOR MOTOR VEHICLE

(75) Inventors: Takayuki Taniguchi, Yokkaichi (JP); Takeshi Yomura, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 153 days.

(21) Appl. No.: 12/314,813

(22) Filed: Dec. 17, 2008

(65) Prior Publication Data

US 2009/0221160 A1    Sep. 3, 2009

(30) Foreign Application Priority Data

Feb. 29, 2008 (JP) .................................. 2008-050798

(51) Int. Cl.
*H01R 12/00* (2006.01)
(52) U.S. Cl. ...................................................... 439/76.1
(58) Field of Classification Search .................. 439/76.1, 439/76.2, 465, 470, 135, 949; 174/50; 220/3.2
See application file for complete search history.

(56) References Cited

U.S. PATENT DOCUMENTS

| | | | | |
|---|---|---|---|---|
| 5,509,812 A * | 4/1996 | Comerci et al. | ............. | 439/76.1 |
| 5,897,392 A * | 4/1999 | Takahashi et al. | ............. | 439/470 |
| 6,183,274 B1 * | 2/2001 | Allum | ............. | 439/135 |
| 6,561,892 B2 * | 5/2003 | Kolkebeck | ............. | 454/61 |
| 6,922,332 B2 * | 7/2005 | Naimi et al. | ............. | 361/641 |
| 7,017,764 B2 * | 3/2006 | Okada | ............. | 220/3.2 |
| 7,172,440 B2 * | 2/2007 | Kanamaru | ............. | 439/135 |
| 7,195,515 B2 * | 3/2007 | Kanamaru | ............. | 439/465 |
| 7,422,443 B2 * | 9/2008 | Kaneko et al. | ............. | 439/76.2 |
| 7,586,038 B2 * | 9/2009 | Kanamaru et al. | ............. | 174/50 |
| 7,614,886 B2 * | 11/2009 | Choi | ............. | 439/76.2 |
| 7,622,674 B2 * | 11/2009 | Kanamaru et al. | ............. | 174/50 |
| 2008/0020606 A1* | 1/2008 | Iizuka | ............. | 439/76.2 |

FOREIGN PATENT DOCUMENTS

| | | |
|---|---|---|
| JP | A-07-177635 | 7/1995 |
| JP | A-11-341646 | 12/1999 |
| JP | A-2003-308738 | 10/2003 |
| JP | A-2006-074893 | 3/2006 |

\* cited by examiner

*Primary Examiner* — Alexander Gilman
(74) *Attorney, Agent, or Firm* — Oliff & Berridge, PLC

(57) ABSTRACT

An electrical junction box for a motor vehicle including a casing body that contains inner circuit members, an upper cover and a lower cover that are mounted and locked on the casing body, and a wire harness connected to the inner circuit members. The casing body includes a depression section that is provided on an outer peripheral wall of the casing body to define an electrical wire arranging space, and wire harness holding portions that project from the depression section and the electrical wire arranging space. The wire harness holding portion having arcuate inner surfaces that contact an exterior of the wire harness the wire harness being disposed in the electrical wire arranging space such that the wire harness is held in the holding portions.

12 Claims, 8 Drawing Sheets

ELECTRIC JUNCTION BOX FOR MOTOR VEHICLE

CROSS-REFERENCE TO RELATED APPLICATION

This application claims priority from Japanese Patent Application No. 2008-050798 filed on Feb. 29, 2008, the entire disclosure of which is incorporated herein by reference.

BACKGROUND

The present invention relates to an electrical junction box for a motor vehicle.

There exists an electrical junction box for a motor vehicle that is structured such that a power supply line is drawn into the electrical junction box and connected to a power supply circuit in the electrical junction box, after the electrical junction box is attached to a vehicle body. Additionally, a wire harness is drawn into the electrical junction box and connected to the last parts to be attached to the electrical junction box.

For example, as illustrated by the enclosed FIG. 7A of the prior art, a wire harness threading port 2 is provided in a lower cover 1 or a casing body, and a lid 3 is connected through a hinge 3a to the port 2. After a wire harness w1 is threaded into the port 2, the port 2 is closed by the lid 3 to hold the wire harness w1 in the electrical junction box.

Furthermore, as illustrated by the enclosed FIG. 7B of the prior art, a distal end of a power supply line w2 is connected to an L-shape terminal 7 having a bolt bore. An additional protection cover 4 is mounted on the power supply line w2 and fixed in an electrical wire drawing recess provided in an outer wall of the electrical junction box.

The present applicant has proposed a waterproof structure for an electrical wire threading port in an electrical junction box to be disposed at a water exposure area in JP-A-2006-74893.

In the waterproof structure disclosed in JP-A-2006-74893, as illustrated in the enclosed FIG. 8, after a first wire harness w3 is inserted into a lower part of a wire harness threading port 5a in a lower cover 5, a second wire harness w4 is inserted into a waterproof cover 6 separated from the lower cover 5, and the second wire harness w4 together with the waterproof cover 6 is incorporated into the lower cover 5 to close the wire harness threading port 5a.

SUMMARY

However, since the hinge structure illustrated in FIG. 7A defines a clearance between an inner peripheral surface of the threading port 2 in the lower cover 1 and an outer surface of the wire harness w1, it is impossible to prevent water from entering a lower part of the lower cover 1 when the electrical junction box is disposed to water (i.e., an engine room or compartment). Thus, a waterproof function of the electrical junction box is decreased. Even by using the additional protection cover 4 illustrated in FIG. 7B, there is an increase in the number of parts used in the production of the electrical junction box, and thus a respective increase in the cost to produce the electrical junction box.

Furthermore, the waterproof structure disclosed in JP-A-2006-74893 requires the additional waterproof cover 6. This will increase the number of parts and costs in the production of the electrical junction box. Since the second wire harness w4 must be inserted into the waterproof cover 6 and then the waterproof cover 6 must be attached to the lower cover 5, the number of working steps will also increase.

In view of the above problems, an object of the embodiments of the present invention is to provide an electrical junction box for a motor vehicle that can hold and position a wire harness disposed at an area that receives water exposure with supreme waterproof function, without providing any additional part(s).

In order to overcome the above problems, the embodiments of the present invention are directed to an electrical junction box for a motor vehicle including a casing body that contains inner circuit members, an upper cover and a lower cover that are mounted and locked on the casing body, and a wire harness connected to the inner circuit members. The casing body includes a depression section that is provided on an outer peripheral wall of the casing body to define an electrical wire arranging space, and wire harness holding portions that project from the depression section and the electrical wire arranging space. The wire harness holding portion having arcuate inner surfaces that contact an exterior of the wire harness the wire harness being disposed in the electrical wire arranging space such that the wire harness is held in the holding portions.

As described above, since the wire harness is threaded into the electrical wire arranging space defined on the depression section of the casing body and held by the wire harness holding protrusions projecting from the depression section, it is possible to easily dispose the wire harness at a desired position without providing any additional attaching casing or the like. Additionally, since the wire harness holding protrusions clamp and hold the wire harness, it is easy to thread the wire harness through the depression section, thereby enhancing workability, positioning, and holding the wire harness.

Since the electrical junction box of the present invention provides an excellent waterproof function for a wire harness drawing section, the electrical junction box can be suitably mounted on an engine room or compartment in a motor vehicle.

That is, since the coupling portions between the wire harness holding protrusions and the wire harness close the wire harness arranging space, it is possible to prevent water from entering a lower part of the depression section.

The wire harness is threaded into the depression section and is drawn into the electrical junction box. Electrical elements such as connectors and relays are connected to a distal end of the wire harness. The wire harness is drawn out from the upper end opening in the depression section to a top side of the casing body and fitted onto the electrical part mounting section on the casing body.

Preferably, the wire harness holding portions define an opening. The wire harness is inserted into the opening and an electrical wire is inserted into an inner part of the depression section. A terminal connected to a distal end of the electrical wire is connected to the inner circuit members of the casing body.

As described above, since the electrical wire is threaded into the inner part of the depression section, it is possible to bundle the threaded wire harness and the electrical wire at a single position, thereby making the configuration of the electrical junction box simple and compact.

Preferably, the electrical wire arranging space is formed by coupling depression sections on outer peripheral walls of the casing body and the lower cover to each other. The wire harness holding portions have outer holding protrusions projecting from opposed sidewalls of the depression section of the casing body. The outer holding protrusions are spaced away from each other to define a opening and the opening is shifted from a central axis of an arranging direction of the wire harness.

Preferably, a size of the opening in the outer holding portions is set to be smaller than a diameter of the wire harness.

Also, the upper cover preferably shrouds the depression section of the casing body.

Thus since the upper cover shrouds the depression section of the casing body, it is possible to prevent water from entering a side part of the casing body as well as a lower part of the casing body.

Accordingly, it is possible to prevent water from entering the electrical junction box without providing any additional protection cover, thereby suppressing a cost in production without increasing the number of parts.

Furthermore, preferably, the upper cover is provided on a lower peripheral edge with a depressed portion. The lower cover is provided with a depressed portion adapted to contact an outer surface of the depressed portion of the upper cover and with a groove adapted to receive a lower end of the depressed portion of the upper cover. The upper and lower covers are coupled to and locked on each other at the depressed portions and groove to perform a waterproof function.

In the prior art electrical junction box, there are many cases where the coupling portions between the upper and lower covers are provided with one-stepped or two-stepped depressed portion or a packing is interposed between the coupling portions in order to prevent water from entering the coupling portions. However, in the case of the one-stepped depressed portion, a flat portion of the lower cover splashes water and the splashed water will enter a lower end of the depressed portion of the upper cover. The splashing of water will be likely to push up the upper cover. In the case of the two-stepped depressed portion, a structure of the electrical junction box will be complicated. In the case of interposing the packing, the number of parts will be increased and a cost in production will be increased.

According to the present invention, as described above, since the lower end of the depressed portion of the upper cover is inserted into the groove in the lower cover, even if the flat portion of the lower cover splashes water onto a lower end of the upper cover, the splashed water cannot push up the upper cover. Consequently, it is possible to prevent the upper cover from being pushed up due to the splashed water, thereby enhancing a waterproof function.

In comparison with a structure in which the upper cover is provided with the two-stepped depressed portion to enhance a waterproof function, since the present invention requires only a single-stepped depressed portion and does not require any additional space, the present invention can enhance a waterproof function by using a minimum amount of space.

As described above, in the embodiments of the present invention, since the wire harness arranging space is defined on the outer peripheral wall of the casing body of the electrical junction box and the wire harness is held by the wire harness holding protrusions projecting from the wire harness arranging space, it is possible to easily dispose the wire harness at a desired position without providing any additional attaching casing or the like. Furthermore, since the wire harness holding protrusions clamp and hold the wire harness, it is easy to thread the wire harness through the depression section, thereby enhancing workability, positioning, and holding the wire harness.

Also, since the electrical wire is threaded into the inner part of the depression section, it is possible to bundle the threaded wire harness and the electrical wire at a single position, thereby making the configuration of the electrical junction box simple and compact.

BRIEF DESCRIPTION OF THE DRAWINGS

Exemplary embodiments will be described below with reference to the drawings, wherein.

DETAILED DESCRIPTION OF EMBODIMENTS

Figure 1:
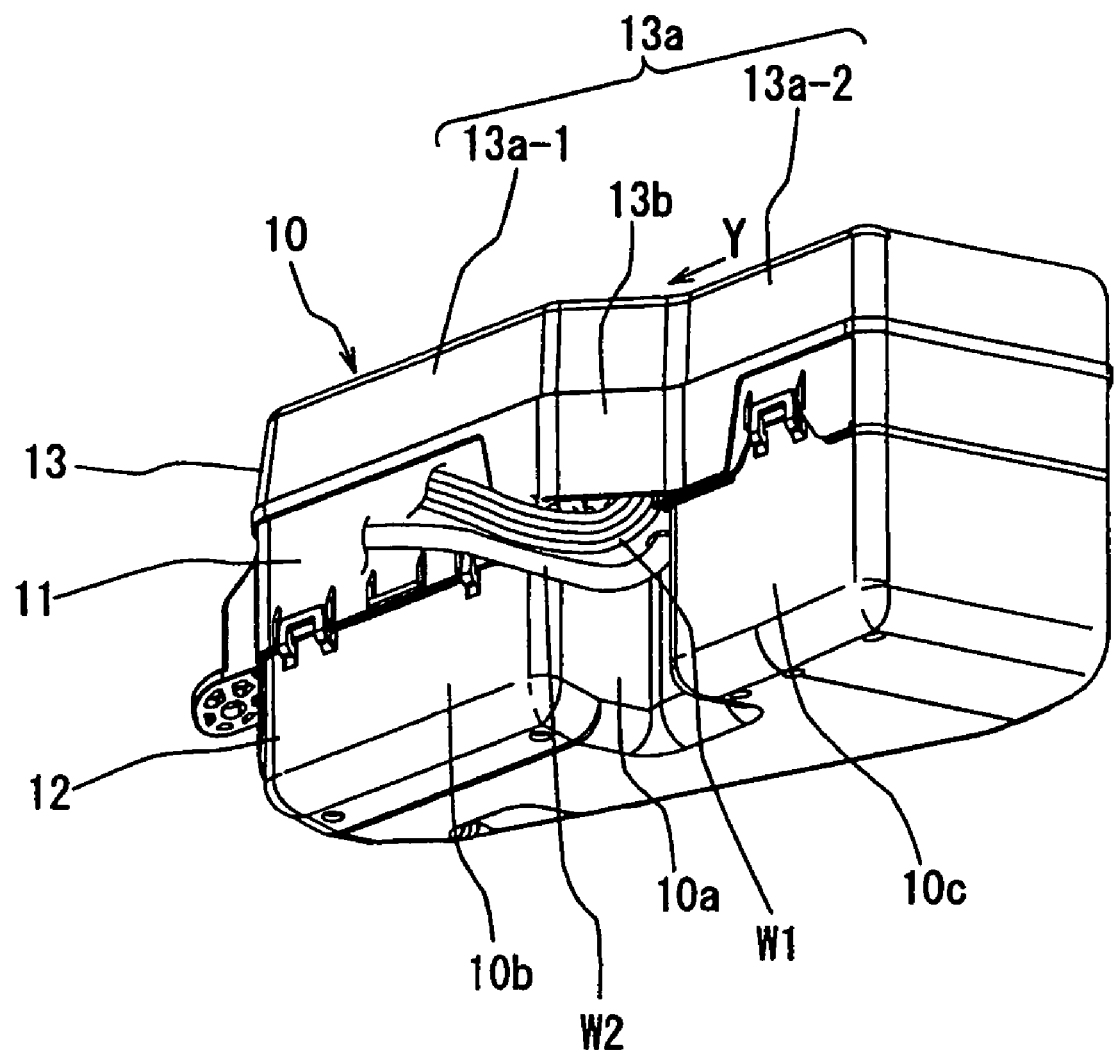
FIG. 1 is a perspective view of a first embodiment of an electrical junction box for a motor vehicle.

Embodiments of an electrical junction box for a motor vehicle in accordance with the present invention will be described below by referring to the drawings.

FIG. 1 to FIG. 5B illustrate a first embodiment of an electrical junction box for a motor vehicle.

An electrical junction box 10 for a motor vehicle according to the present invention is mounted on an engine room or compartment disposed at a water exposure area in a motor vehicle. The electrical junction box 10 includes a casing body 11 that contains inner circuit members, a lower cover 12, and an upper cover 13. The upper and lower covers 13 and 12 are mounted on and locked on the casing body 11.

In a succeeding process such as an assembling process of a motor vehicle, electrical wires provided with connectors to be connected to the inner circuit members in the casing body 11 are bundled together before hand. A wire harness W1 and a power supply line W2 are covered with corrugated tubes and are drawn into the electrical junction box 10.

Figure 2A:
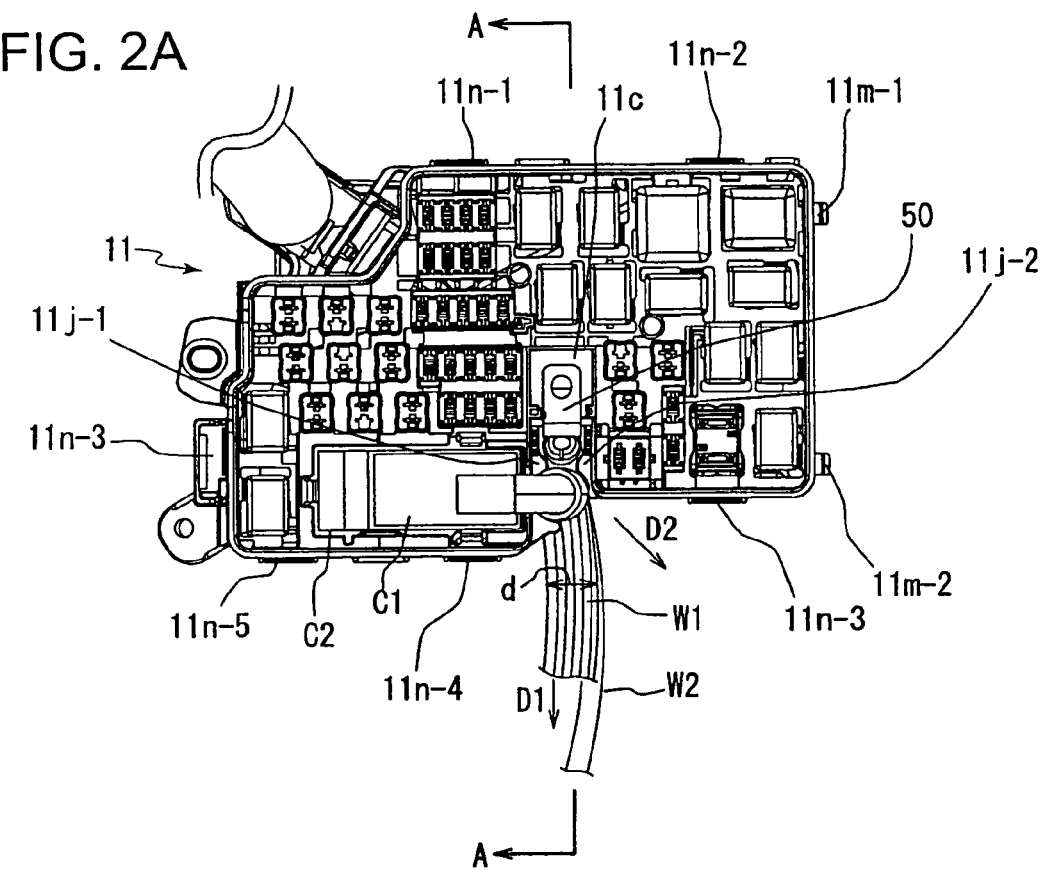
FIG. 2A is a plan view of FIG. 1, illustrating the electrical junction box from which an upper cover is removed.

As illustrated in FIG. 2A, a connector C1 is connected to a distal end of the wire harness W1. A lever type connector C2 is detachably mounted on a mounting section 11*i* (FIG. 3A) in the casing body 11. The connectors C1 and C2 are coupled to each other. An L-shape terminal 50 is connected to a distal end of the power supply line W2. The power supply line W2 is connected to an electrical wire connecting section 11*c* in the casing body 11.

Although the wire harness W1 and power supply line W2 are not covered with the corrugated tubes in the first embodiment, the corrugated tubes may cover either one or both of them.

Figure 3A:
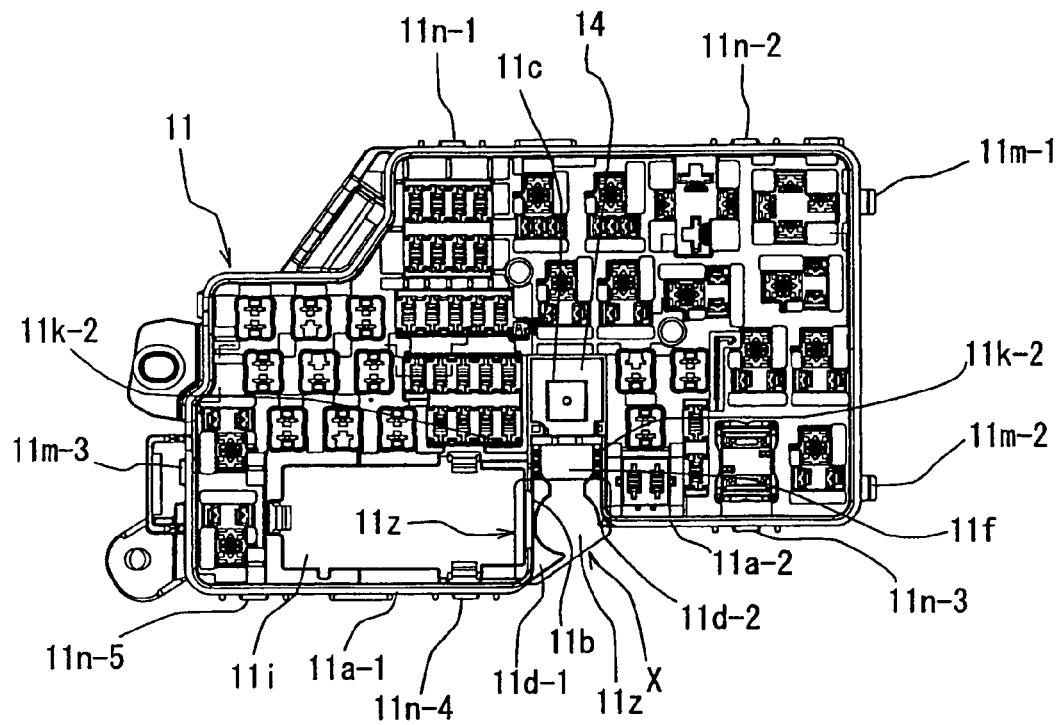
FIG. 3A is a plan view of a casing body.
Figure 3B:
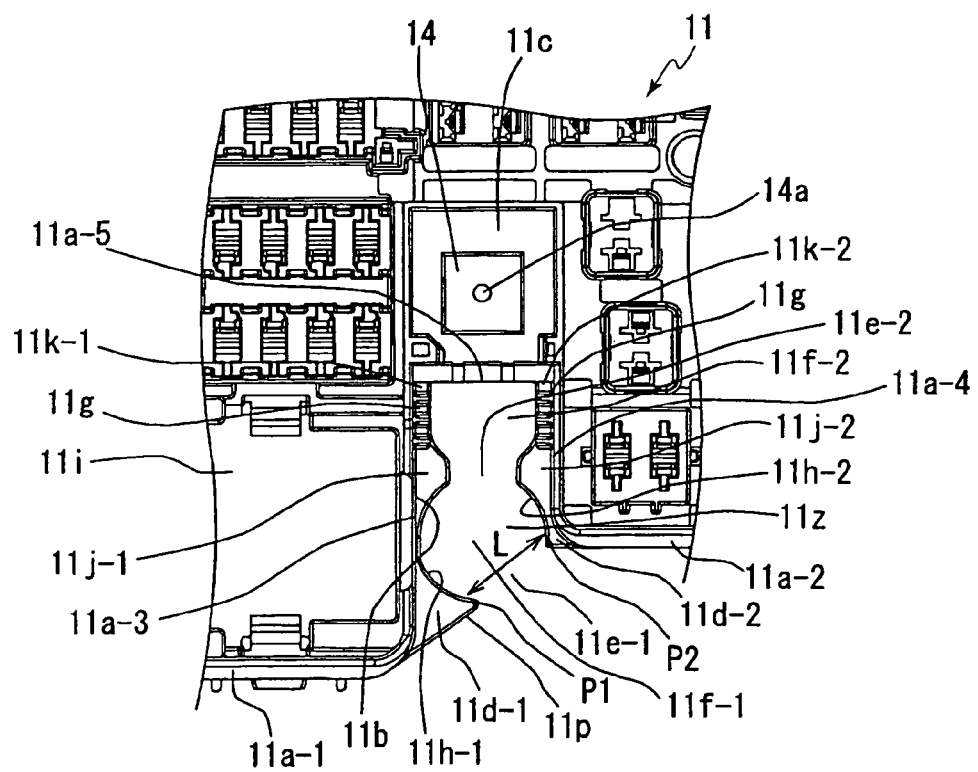
FIG. 3B is an enlarged plan view of a main part shown in FIG. 3A.

As illustrated in FIG. 3A, the casing body 11 is provided on one side of an outer peripheral wall with a first peripheral wall portion 11*a*-1 and a second peripheral wall portion 11*a*-2. The first peripheral wall portion 11*a*-1 projects outward more than the second peripheral wall portion 11*a*-2 at an intermediate position of the one side of the outer peripheral wall. As shown in FIG. 3B, a depression section X is provided on the one side of the outer peripheral wall of the casing body 11 at the intermediate position and is defined by side walls 11a-3 and 11a-4 that extend toward a center of the casing body 11 from ends of the first and second peripheral wall portions 11a-1 and 11a-2 and by an inner part wall 11a-5 that interconnects the side walls 11a-3 and 11a-4. The depression section X is provided with a recess 11b (described after) extending in a vertical or height direction of the casing body 11. The recess 11b serves as a space for threading the wire harness W1 and power supply line W2.

As illustrated in FIG. 3B, the recess 11b of the casing body 11 is provided with a pair of wire harness holding protrusions 11z that project from the side walls 11a-3 and 11a-4 so that the wire harness holding protrusions 11z surround an interior of the depression section X and hold the wire harness W1. The wire harness holding protrusions 11z include outer holding protrusions 11d-1 and 11d-2 and inner holding protrusions 11j-1 and 11j-2. Arcuate inner surfaces 11h-1 and 11h-2 are defined between the outer holding protrusions 11d-1 and 11d-2 and inner holding protrusions 11d-1 of the wire harness holding protrusions 11z and the inner holding protrusions 11j-1 and 11j-2. The arcuate inner surfaces 11h-1 and 11h-2 substantially contact with an exterior of the wire harness W1 to define a wire harness threading section 11f-1.

Although each wire harness holding portion 11z has about 7 mm in height (thickness) in the vertical direction in the first embodiment, the height is not limited to the value so long as the portion 11z has strength enough to surely hold the wire harness W1.

The outer holding protrusion 11d-1 is provided with an open side end surface 11p that inclines toward the opposed outer holding protrusion 11d-2. A first opening 11e-1 for receiving the wire harness W1 inclines with respect to the peripheral walls 11a-1 and 11a-2 of the casing body 11.

A central axis of the wire harness threading section 11f-1 of the recess 11b is shifted from a center of the first opening 11e-1 in its width direction. As shown in FIG. 2A, an arranging direction D1 of the wire harness W1 in the recess 11b differs from an inserting direction D2 to the first opening 11e-1.

A width L of the first opening 11e-1, that is, a distance L from the inclined distal end P1 (distal end of the first outer holding protrusion 11d-1) to a distal end P2 of the second outer holding protrusion 11d-2 is set to be shorter than the diameter d of the wire harness W1.

The depression section X is provided on an inner part (near a center of the casing body 11) with a threading section 11f-2 for receiving the power supply line W2. The power supply line threading section 11f-2 is defined by the inner part wall 11a-5, projections 11k-1 and 11k-2 that project from the side walls 11a-3 and 11a-4 so as to oppose each other, and the inner holding protrusions 11j-1 and 11j-2 continued to the projections 11k-1 and 11k-2.

A plurality of ribs 11g project upward from top surfaces of the projections 11k-1 and 11k-2. The ribs 11g are provided so as to prevent an L-shape terminal 50 (described below) from being deformed or to prevent the projections 11k-1 and 11k-2 from being broken on account of contact between the L-shape terminal 50 and the projections 11k-1 and 11k-2, when the power supply line W2 is connected to the power supply line connecting section 11c.

The inner holding protrusions 11j-1 and 11j-2 are spaced away from each other to define a second opening 11e-2 for receiving the power supply line W2. A distance between the spaced inner holding protrusions 11j-1 and 11j-2 is set to be smaller than a width of the first opening 11e-1, and greater than the diameter of the power supply line W2.

Figure 2B:
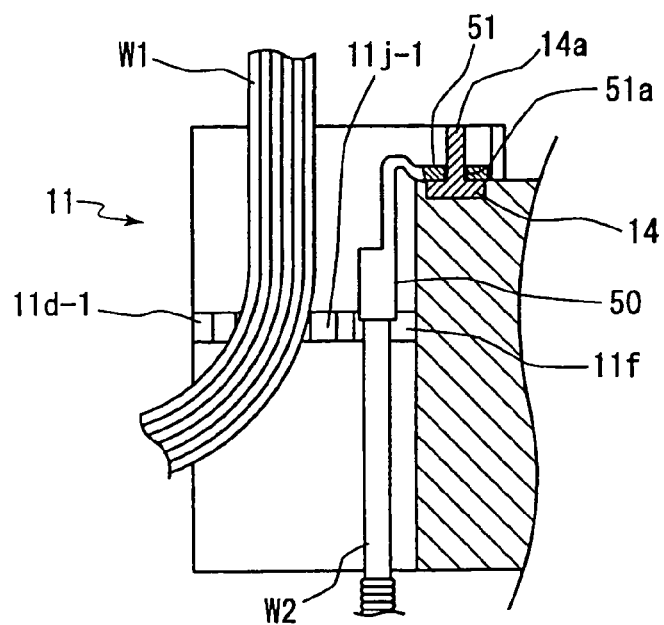
FIG. 2B is an enlarged cross section view taken from lines A-A in FIG. 2A, illustrating a main part of the box.

The casing body 11 is provided on a top surface at the position adjacent to the threading section 11f-2 with the power supply line connecting section 11c. A stud bolt 14a is connected to a bus bar 14 that serves as a power supply circuit. As shown in FIG. 2B, the stud bolt 14a is inserted into a bolt bore 51a in a horizontal portion 51 of the L-shape terminal 50 connected to the distal end of the power supply line W2. The power supply line W2 is connected to the power supply line connecting section 11c. The casing body 11 is provided in the top surface with the mounting section 11i for receiving the lever type connector C2.

As illustrated in FIG. 1, a depression section Y is provided on the upper cover 13 at the position opposed to the depression section X on the casing body 11. A first peripheral wall 13a-1 projects outward from a second peripheral wall 13a-2. In the depression section Y, a cover piece 13b extends downward from a lower end of the peripheral wall 13a to the lower cover 12 so as to cover the depression section X of the casing body 11 and a depression section Z (FIGS. 5A and 5B) of the lower cover 12.

Figure 5A:
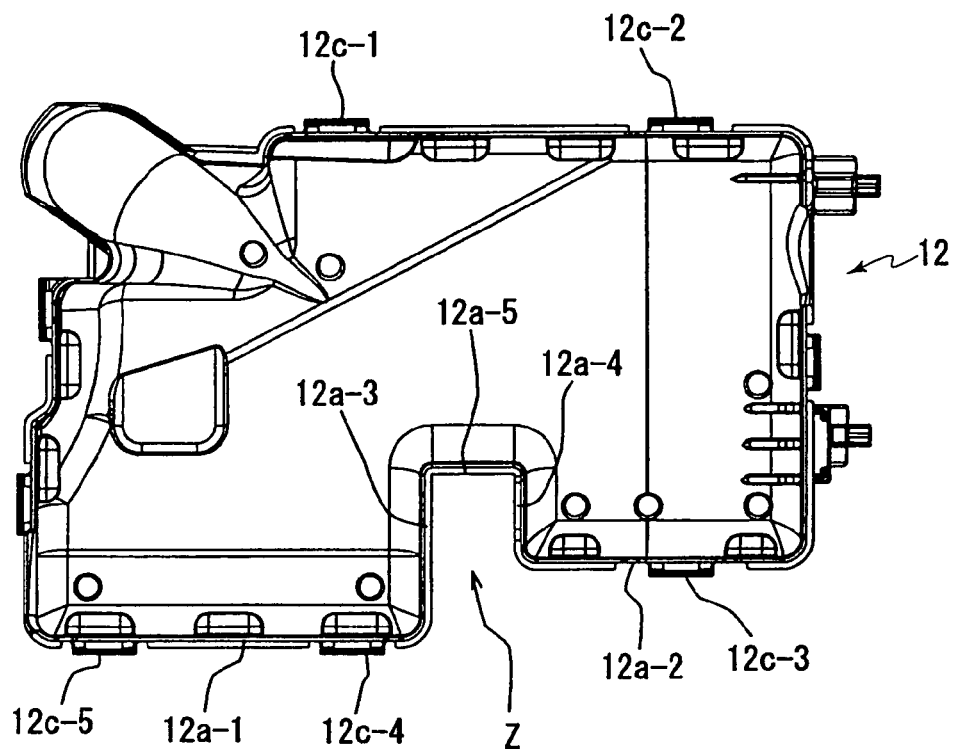
FIG. 5A is a plan view of a lower cover.
Figure 5B:
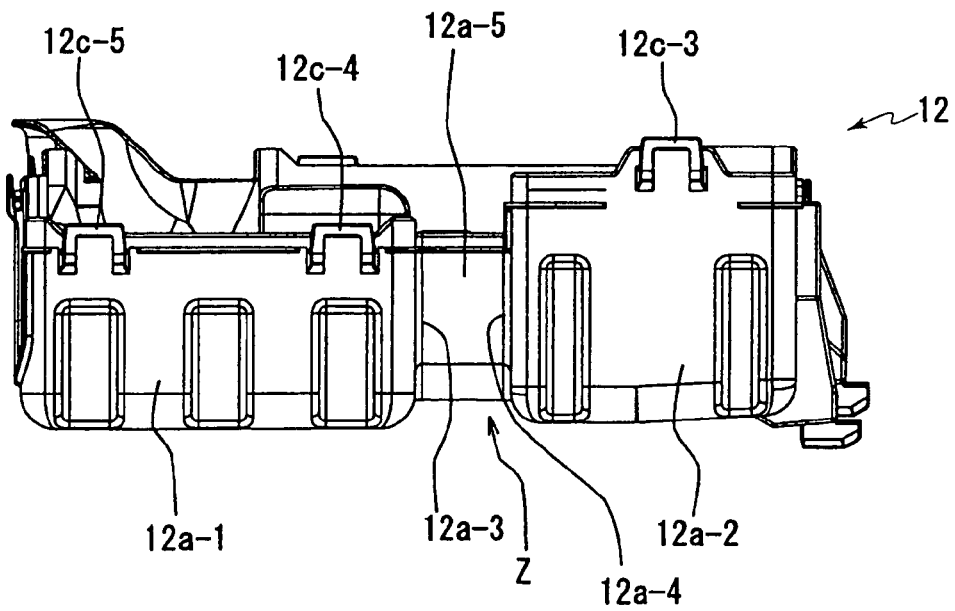
FIG. 5B is a front elevation view of the lower cover.

As illustrated in FIGS. 5A and 5B, the lower cover 12 includes a first peripheral wall 12a-1 and a second peripheral wall 12a-2 projecting outward from the first peripheral wall 12a-1, as in the case of the casing body 11. The depression section Z is defined by side walls 12a-3 and 12a-4 extending inward from the first and second side walls 12a-1 and 12a-2, and an inner part wall 12a-5 connecting the first and second side walls 12a-3 and 12a-4.

When the lower cover 12 is mounted on the casing body 11, the depression section X of the casing body 11 is continued to the depression section Z of the lower cover 12 to define an electrical wire arranging space extending in the vertical direction.

Figure 4:
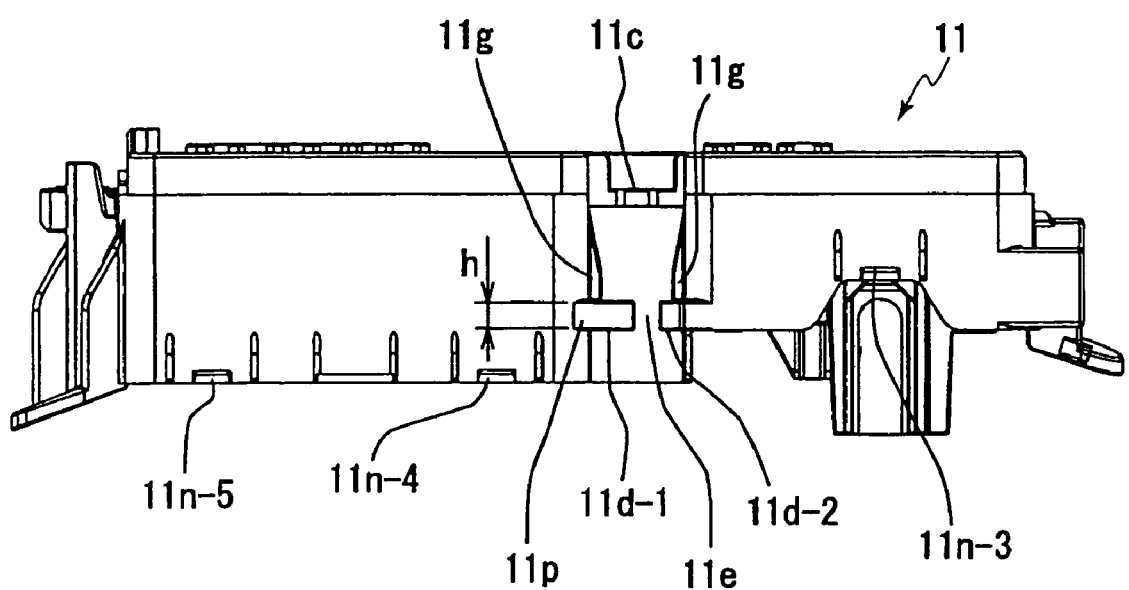
FIG. 4 is a front elevation view of the casing body.

As illustrated in FIG. 2A, the casing body 11 is provided on upper and lower ends with pawls 11m-1 to 11m-3 and 11n-1 to 11n-5 (FIG. 4). The pawls are spaced laterally away from one another. The pawls 11m-1 to 11m-3 on the upper end of the casing body 11 are coupled to and locked on an engaging frame (not shown) of the upper cover 13. The pawls 11n-1 to 11n-5 on the lower end of the casing body 11 are coupled to and locked on engaging frames 12c-1 to 12c-5 of the lower cover 12.

Next, a process for arranging the wire harness W1 and power supply line W2 will be explained.

First, the power supply line W2 is inserted into the first opening 11e-1, passed through the wire harness threading section 11f-1 and the second opening 11e-2, and disposed in the power supply line threading section 11f-2. Then, the stud bolt 14a is inserted into the bolt bore 51a in the horizontal portion 51 of the power supply terminal 50 connected to the distal end of the power supply line W2 to connect the power supply line W2 to the power supply connecting portion 11c.

Second, the wire harness W1 connected to the connector C1 is inserted into the first opening 11e-1 to contact the exterior of the wire harness W1 with the arcuate inner surfaces 11h-1 and 12h-2, and disposed in the wire harness threading section 11f-1. Then, the connector C1 is coupled to the lever type connector C2 in the mounting section 11i in the casing body 11. Thus, two kinds of wire members are arranged adjacent to each other in the electrical wire arranging space defined by the depression section X of the casing body 11 and the depression section Z of the lower cover 12.

Since the connector C1 is a multipole type connector and a plurality of electrical wires are drawn out from the connector C1 in the first embodiment, a diameter of the wire harness W1 is greater than that of the power supply line W2. Consequently, the wire harness W1 hides the power supply line W2 having a smaller diameter, thereby preventing the power supply line W2 from being exposed to water directly.

The connector C1 to be connected to the wire harness W1 may not be always the multipole connector. The diameter of the wire harness W1 may not be always greater than that of the power supply line W2. The diameters of these two kinds of the wire members may be the same so long as the power supply line W2 is disposed inside and the wire harness W1 is disposed outside.

In the electrical junction box having the above structure in accordance with the present invention, the wire harness W1 is drawn into the depression section X of the casing body 11 and the depression Y of lower cover 12, the wire harness W1 is pushed through the outside into the first opening 11e-1, and the exterior of the wire harness W1 is brought into contact with the arcuate inner surfaces 11h-1 and 11h-2 to arrange the wire harness W1 in the wire harness threading section 11f-1. Since the diameter of the second opening 11e-2 is smaller than that of the wire harness W1, the wire harness W1 does not pass the second opening 11e-2 by a mistake. Accordingly, it is possible to readily position and hold the wire harness W1 in the electrical junction box 10 without causing any mistake.

Since the upper cover 13 shrouds the depression sections X and Y, it is possible to prevent water from entering a side portion of the electrical junction box 10. Accordingly, it is possible to enhance a waterproof function of the electrical junction box without providing any additional protection cover.

Since the wire harness holding section 11z includes the outer holding protrusions 11d-1 and 11d-2 and the inner holding protrusions 11j-1 and 11j-2 and the power supply line threading section 11f-2 includes projections 11k-1 and 11k-2, these sections can prevent water from splashing upward, and thereby prevent the wire harness W1 and power supply line W2 from being directly exposed to water.

Since the power supply line W2 connected to the inner circuit members in the casing body 11 is threaded into the inner parts of the depression sections X and Y, the L-shape terminal 50 connected to the distal end of the power supply line W2 is connected to the inner circuit members, and the wire harness W1 and power supply line W2 are threaded into a single electrical wire arranging space, it is possible to make a configuration of the electrical junction box simple and compact. Since the wire harness W1 is disposed adjacent to the outside of the power supply line W2, it is possible to prevent the power supply line W2 from being exposed to water directly and to suppress water from contacting the L-shape terminal 50 and bus bars 14, which would otherwise cause a current leak.

Furthermore, the arranging direction D1 of the wire harness W1 differs from the opening direction D2 of the first opening 11e-1 for receiving the electrical wires. The outer holding protrusions 11d-1 and 11d-2 can clamp the exterior of the wire harness W1 to push the wire harness W1 onto the arcuate inner surfaces 11h-1 and 11h-2. Accordingly, the wire harness W1 cannot easily come out from the first opening 11e-1 for receiving the electrical wires, thereby preventing the wire harness W1 from leaving the wire harness threading section 11f-1.

Figure 6:
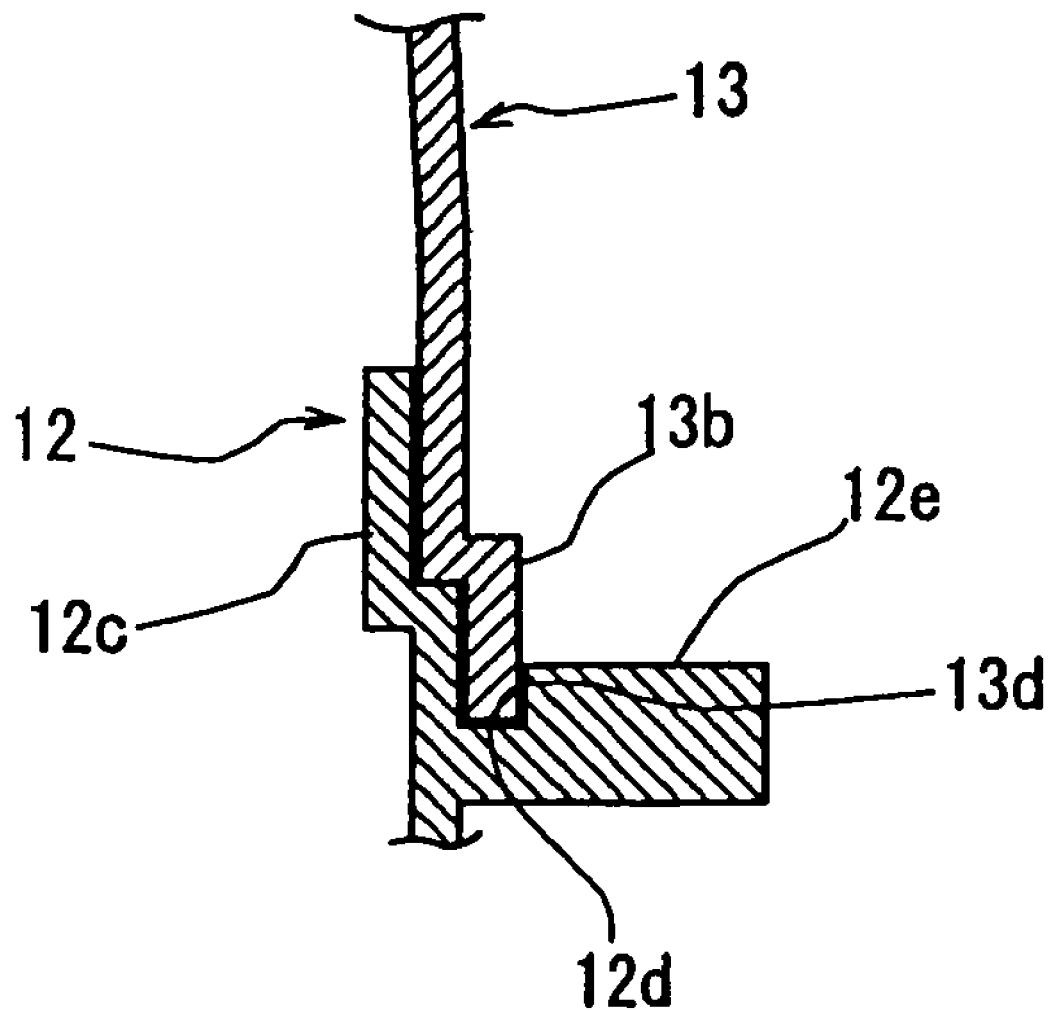
FIG. 6 is a sectional view of a coupling portion between an upper cover and a lower cover in a second embodiment of the electrical junction box.
Figure 7A:
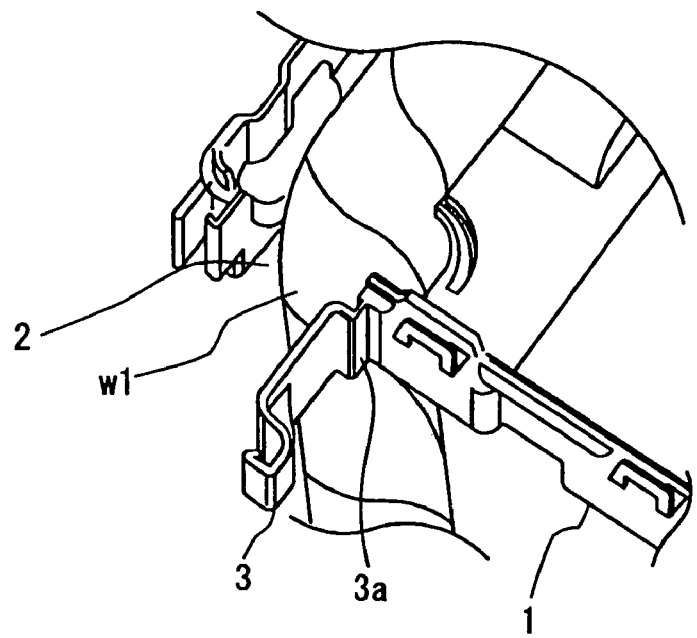
FIG. 7A is a perspective view of a part of a prior art electrical junction box.
Figure 7B:
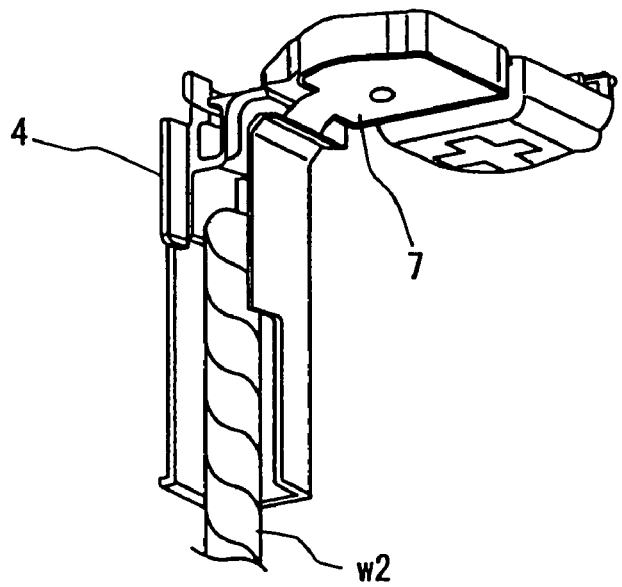
FIG. 7B is a perspective view of an L-shape terminal and a protection cover in the prior art electrical junction box.
Figure 8:
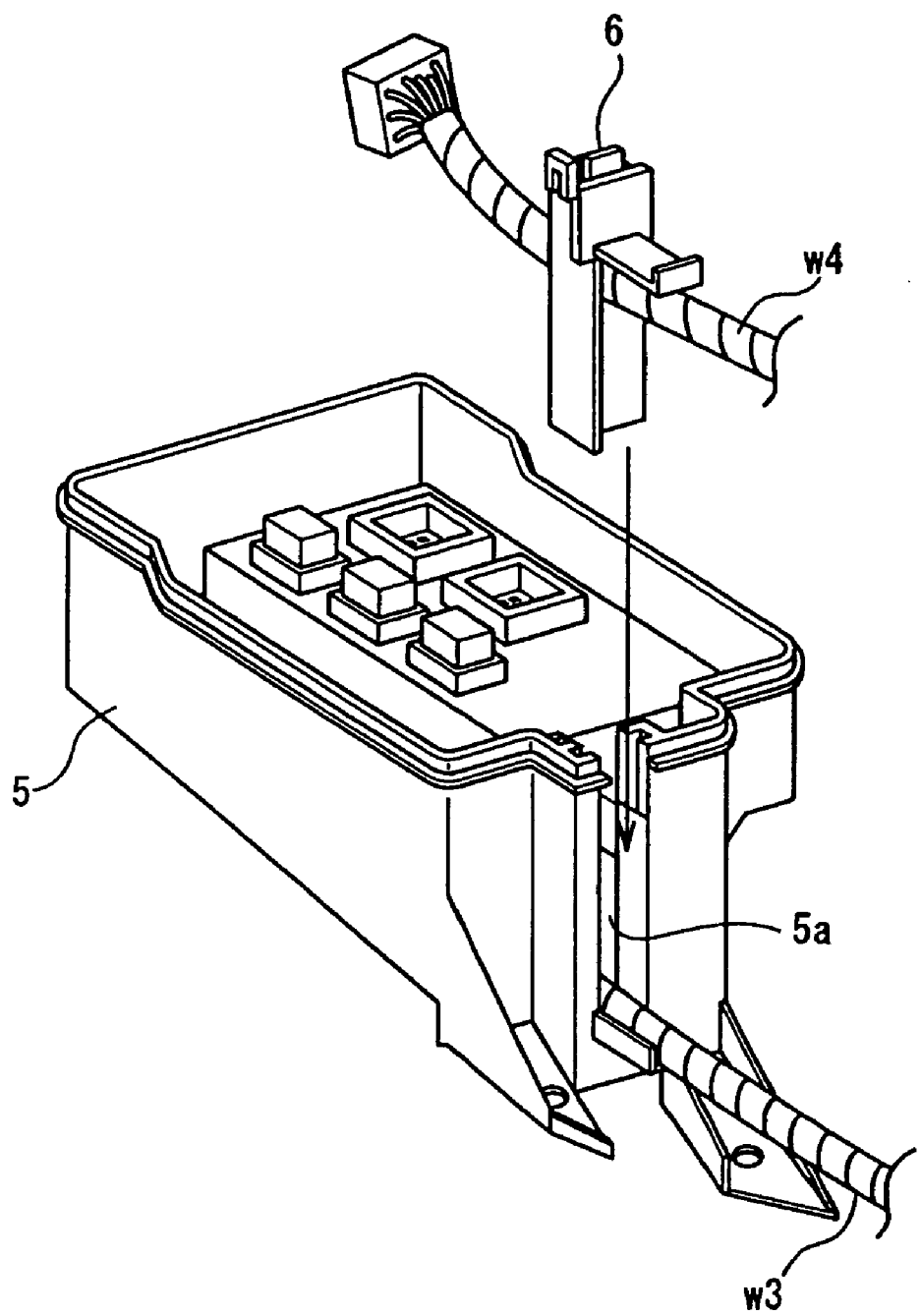
FIG. 8 is a perspective view of a prior art electrical junction box provided with a waterproof structure.

FIG. 6 illustrates a second embodiment of an electrical junction box for a motor vehicle.

As illustrated in FIG. 6, in the second embodiment of the electrical junction box, an upper cover 13 is mounted on a lower cover 12. The upper cover 13 is provided on a lower peripheral edge with a depressed portion 13b while the lower cover 12 is provided with a depression 12c that contacts an outer surface of the depression 13b of the upper cover 13. The lower cover 12 is provided in an end periphery of a flat portion 12e with a groove 12d into which a lower end 13d of the depressed portion 13b of the upper cover 13 is inserted.

According to the above structure, since the lower end 13d of the depressed portion 13b of the upper cover 13 is inserted into the groove 12d in the lower cover 12, even if the flat portion 12e of the lower cover 12 splashes water onto a lower end of the upper cover 13, the splashed water cannot push up the upper cover 13. Consequently, it is possible to prevent the upper cover from being pushed up due to the splashed water, thereby enhancing a waterproof function.

In comparison with a structure in which the upper cover is provided with a two-stepped depressed portion to enhance a waterproof function, since the second embodiment requires only a single-stepped depressed portion and does not require any additional space, the second embodiment can enhance a waterproof function by a minimum space.

Since the upper cover 13 extends to the lower cover 12 in the second embodiment, it is not necessary to extend the cover piece 13b downward from the upper cover 13 as in the case of the first embodiment.

Since the construction and operational effects in the second embodiment are the same as those in the first embodiment, explanations of them are omitted here merely by giving the same reference numbers to the same elements or portions of the electrical junction box 10.

What is claimed is:

1. An electrical junction box for a motor vehicle comprising:
   a casing body that contains inner circuit members;
   an upper cover and a lower cover that are mounted and locked on the casing body; and
   a wire harness connected to the inner circuit members;
   the casing body includes:
      a depression section that is provided on an outer peripheral wall of the casing body to define an electrical wire arranging space; and
      wire harness holding portions that project from the depression section and the electrical wire arranging space, wherein the wire harness holding portions have
         outer holding protrusions that are spaced away from each other to define an opening and that project from opposed side walls of the depression section of the casing body, and
         arcuate inner surfaces that contact an exterior of the wire harness, the wire harness being disposed in the electrical wire arranging space such that the wire harness is held in the holding portions.

2. The electrical junction box for the motor vehicle according to claim 1, wherein:
   the wire harness holding portions define an opening;
   the wire harness is inserted into the opening;
   an electrical wire is inserted into an inner part of the depression section; and
   a terminal connected to a distal end of the electrical wire is connected to the inner circuit members of the casing body.

3. The electrical junction box for the motor vehicle according to claim 2, wherein:
   the upper cover shrouds the depression section of the casing body;
   the upper cover is provided on a lower peripheral edge with a depressed portion;
   the lower cover is provided with a depressed portion adapted to contact an outer surface of the depressed portion of the upper cover and is provided with a groove adapted to receive a lower end of the depressed portion of the upper cover; and the upper and lower covers are coupled to and locked on to each other at the depressed portions and the groove.

4. The electrical junction box for the motor vehicle according to claim 2, wherein:

the electrical wire arranging space is formed by coupling depression sections on outer peripheral walls of the casing body and the lower cover to each other;

the wire harness holding portions have outer holding protrusions projecting from opposed side walls of the depression section of the casing body;

the outer holding protrusions are spaced away from each other to define the opening; and the opening is shifted from a central axis of an arranging direction of the wire harness.

5. The electrical junction box for the motor vehicle according to claim 4, wherein a size of the opening in the outer holding portions is set to be smaller than a diameter of the wire harness.

6. The electrical junction box for the motor vehicle according to claim 5, wherein:

the upper cover shrouds the depression section of the casing body;

the upper cover is provided on a lower peripheral edge with a depressed portion;

the lower cover is provided with a depressed portion adapted to contact an outer surface of the depressed portion of the upper cover and is provided with a groove adapted to receive a lower end of the depressed portion of the upper cover; and the upper and lower covers are coupled to and locked on to each other at the depressed portions and the groove.

7. The electrical junction box for the motor vehicle according to claim 4, wherein:

the upper cover shrouds the depression section of the casing body;

the upper cover is provided on a lower peripheral edge with a depressed portion;

the upper cover shrouds the depression section of the casing body;

the upper cover is provided on a lower peripheral edge with a depressed portion;

the lower cover is provided with a depressed portion adapted to contact an outer surface of the depressed portion of the upper cover and is provided with a groove adapted to receive a lower end of the depressed portion of the upper cover; and the upper and lower covers are coupled to and locked on to each other at the depressed portions and the groove.

8. The electrical junction box for the motor vehicle according to claim 1, wherein:

the upper cover shrouds the depression section of the casing body;

the upper cover is provided on a lower peripheral edge with a depressed portion;

the lower cover is provided with a depressed portion adapted to contact an outer surface of the depressed portion of the upper cover and is provided with a groove adapted to receive a lower end of the depressed portion of the upper cover; and the upper and lower covers are coupled to and locked on to each other at the depressed portions and the groove.

9. The electrical junction box for the motor vehicle according to claim 1, wherein:

the electrical wire arranging space is formed by coupling depression sections on outer peripheral walls of the casing body and the lower cover to each, other and the opening is shifted from a central axis of an arranging direction of the wire harness.

10. The electrical junction box for the motor vehicle according to claim 9, wherein a size of the opening in the outer holding portions is set to be smaller than a diameter of the wire harness.

11. The electrical junction box for the motor vehicle according to claim 10, wherein:

the upper cover shrouds the depression section of the casing body;

the upper cover is provided on a lower peripheral edge with a depressed portion;

the lower cover is provided with a depressed portion adapted to contact an outer surface of the depressed portion of the upper cover and is provided with a groove adapted to receive a lower end of the depressed portion of the upper cover; and the upper and lower covers are coupled to and locked on to each other at the depressed portions and the groove.

12. The electrical junction box for the motor vehicle according to claim 9, wherein:

the upper cover shrouds the depression section of the casing body;

the upper cover is provided on a lower peripheral edge with a depressed portion;

the lower cover is provided with a depressed portion adapted to contact an outer surface of the depressed portion of the upper cover and is provided with a groove adapted to receive a lower end of the depressed portion of the upper cover; and the upper and lower covers are coupled to and locked on to each other at the depressed portions and the groove.

* * * * *